United States Patent
Persson

(10) Patent No.: US 6,519,384 B2
(45) Date of Patent: Feb. 11, 2003

(54) OPTICAL COMMUNICATION NETWORK

(75) Inventor: Ulf A. Persson, Skogås (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/941,953

(22) Filed: Aug. 29, 2001

(65) Prior Publication Data

US 2002/0034358 A1 Mar. 21, 2002

Related U.S. Application Data

(60) Provisional application No. 60/232,486, filed on Sep. 13, 2000.

(30) Foreign Application Priority Data

Aug. 30, 2000 (EP) .............................................. 00118759

(51) Int. Cl.$^7$ ................................................ G02B 6/28
(52) U.S. Cl. ......................................... 385/24; 359/127
(58) Field of Search ............................. 385/24, 15, 37, 385/41, 42, 46, 47; 359/115, 118, 124, 127, 130

(56) References Cited

U.S. PATENT DOCUMENTS

| | | | | |
|---|---|---|---|---|
| 5,774,606 A | | 6/1998 | de Barros et al. ............. | 385/24 |
| 6,084,694 A | | 7/2000 | Milton et al. ................ | 359/124 |
| 6,385,366 B1 | * | 5/2002 | Lin ............................ | 359/125 |

FOREIGN PATENT DOCUMENTS

| | | |
|---|---|---|
| EP | 0 938 205 A2 | 8/1999 |
| WO | WO 98/52306 | 11/1998 |
| WO | WO 99/35775 | 7/1999 |
| WO | WO 00/08791 | 2/2000 |

OTHER PUBLICATIONS

European Search Report completed on Mar. 9, 2001, in connection with application EP 00 11 8759 as filed.

International Search Report Complete by ISA/EP on Nov. 30, 2001, in connection to International Application No. PCT/EP01/09940 as filed Aug. 29, 2001.

* cited by examiner

Primary Examiner—Akm E. Ullah
(74) Attorney, Agent, or Firm—Jenkens & Gilchrist, P.C.

(57) ABSTRACT

In a WDM network, nodes connected to a common transmission medium have add/drop filters for associated channel wavelengths which passively relay all other wavelengths while subjecting these to a pass-through loss. In order to optimize the transmission distance of a network, the filter elements within a node are arranged such that those channels that have the highest link losses are relayed through as few add/drop filter elements as possible. In particular, filter elements are arranged such that received channel wavelengths with a high link loss are dropped from said transmission medium upstream of received channel wavelengths with a low link loss. Similarly, for channel wavelengths transmitted by the node, the filters are arranged such that transmitted channel wavelengths with a high link loss are added to said transmission medium downstream of transmitted channel wavelengths with a low link loss. In this manner the additional losses caused by the add/drop filters are sustained by those channels that are better able to tolerate the additional power loss.

11 Claims, 1 Drawing Sheet

OPTICAL COMMUNICATION NETWORK

CROSS-REFERENCES TO RELATED APPLICATIONS

This appln claims the benefit of priority of U.S. patent application Ser. No. 60/232,486 filed Sep. 13, 2000.

FIELD OF THE INVENTION

The invention relates to optical communication networks and particularly to networks wherein channels are added to and dropped from the network at different locations or nodes.

BACKGROUND ART

In traditional point-to-point WDM optical communication networks, wherein each wavelength represents a channel all channels are multiplexed together at a sending node, transmitted through the network and then demultiplexed at the receiving node. The multiplexer and demultiplexer typically have substantially the same loss for all wavelengths, so that performance will not vary significantly between channels. However, in systems wherein individual channels are added and dropped at intermediate nodes within a network, the link losses for each channel, that is the power losses imposed on a channel between a transmitter and receiver, will differ depending on the path taken. This applies to all types of network configuration, including point-to-point and ring networks. A channel experiences losses through the length of optical fibre, at each add/drop filter both when the channel is added to or dropped from the transmission path and also when it is reflected or transmitted through a filter.

In order to reduce the losses in the different channels, filter components are selected to have low add/drop losses and also low pass-through losses. A number of different filter technologies exist which are capable of performing this function. When a few channels are dropped or added at a node, thin film filters or fibre grating based filters are commonly used. These filters are then stacked, so that all channels passing through the node will be subjected to the pass-through losses of each filter.

EP 0 905 936 describes an optical fibre network having nodes that allow the passive pass-through of channels. Losses at each node are reduced by means of add/drop filters which add and drop wavelength bands, respectively. The add and drop filters each consist of a single optical interference filter. The component channels are combined or separated using a multiplexer connected upstream of the add filter and demultiplexer connected downstream of the drop filter, respectively. While the arrangement described in this prior art reference reduces the losses within a network, some channels may nevertheless have a link loss that exceeds system requirements. For such channels a semiconductor optical preamplifier or power amplifier or both can be utilised. For networks using only passive components between the transmitter and receiver, the network length is limited by the channels with the highest link losses.

SUMMARY OF INVENTION

In the light of prior art arrangements it is an object of the present invention to provide an optical communications network, in which the channel losses are controlled so as to optimise the network transmission distance.

This is achieved by distributing the losses occurring within a network more evenly between multiple channels. More specifically, the invention relates to a network capable of carrying multiple WDM channel wavelengths, wherein multiple nodes are connected via a transmission medium and have filter elements for adding channel wavelengths transmitted by said node to said transmission medium and/or dropping channel wavelengths destined for said node from said transmission medium. All other wavelengths are passively relaying through the filter elements but sustain a loss of power thereby. At least two nodes in the network have two or more filter elements for either adding or dropping channel wavelengths. The filter elements within these two nodes are arranged such that those channels that have the highest link losses are relayed through as few add/drop filter elements as possible. In particular, filter elements are arranged such that received channel wavelengths with a high link loss relative to an allowed link loss are dropped from said transmission medium upstream of received channel wavelengths with a low link loss relative to an allowed link loss. Similarly, for channel wavelengths originating or transmitted by the node, the filter elements are arranged such that transmitted channel wavelengths with a high link loss relative to an allowed link loss are added to said transmission medium downstream of transmitted channel wavelengths with a low link loss relative to an allowed link loss. The link loss is the loss of power sustained throughout the transmission path of a channel and may include losses both upstream and downstream of the add/drop filter elements. The link loss is expressed as a quantity relative to an allowed link loss, and most preferably as a proportion of an allowed link loss. Thus the nodes may be configured such that those channels that require a lower link loss, for example due to higher bit rates, and have a low absolute link loss compared to other channels are nevertheless still spared additional losses due to add/drop filter elements that the channel is less able to tolerate.

By imposing the additional losses caused by the passive pass-through of the add/drop filters on channels that have losses well below the maximum level imposed by system requirements, those channels with high link losses relative to an allowed link loss and which therefore limit the network length, are capable of tolerating additional loss elsewhere, possibly as additional transmission distance.

In accordance with a further aspect of the invention, a network node is proposed having at least two combining elements, at least one of these elements being capable of adding a waveband containing multiple channel wavelengths. This band combining element includes a first filter for adding the specified waveband and a multiplexer coupled to the first filter. The multiplexer may consist of a series of multiple cascaded fine filters. The fine filters are each adapted to pass a specified channel wavelength and passively transmit, or reflect, the other wavelengths within the waveband. The combining elements are arranged such that channel wavelengths having a high link loss relative to an allowable link loss are added to the transmission line downstream of channels wavelengths having a lower link loss relative to an allowable link loss.

The invention further resides in node of a WDM network having at least two wavelength extracting elements, at least one of these elements being capable of dropping a waveband containing multiple channel wavelengths. This band extracting element includes a first filter for dropping the specified waveband and a demultiplexer coupled to the first filter. The demultiplexer preferably consists of a series of multiple cascaded fine filters. The fine filters are each adapted to pass a specified channel wavelength and passively transmit, or reflect, the other wavelengths within the waveband. The extracting elements are arranged such that channel wavelengths having a high link loss relative to an allowable link loss are dropped from the transmission line upstream of channels wavelengths having a lower link loss relative to an allowable link loss.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION OF THE DRAWINGS

Figure 1:
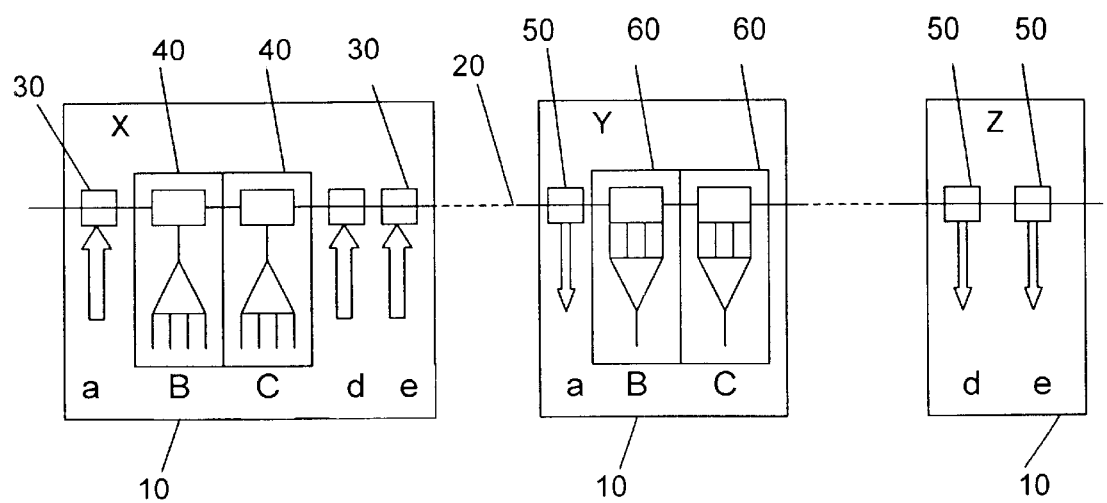
FIG. 1 schematically depicts the add/drop filters located at three nodes in a section of an optical network.

FIG. 1 depicts a segment of an optical network. Three nodes 10 are illustrated. The nodes 10 are connected to an optical fibre transmission path 20 that links several nodes in a network. The transmission path 20 is assumed to be unidirectional with traffic carried from left to right in the figure as indicated by the arrow. The illustrated network segment may be part of a point-to-point or ring configuration or of any other network configuration. For ease of understanding, the first or upstream node 10 in the illustrated segment will be referred to as node X, the second node as node Y and the third node as node Z.

The three illustrated nodes 10 are each either the source or destination of a group of specified channel wavelengths. These channel wavelengths are denoted by the letters a to e, with lower case letters a, d and e representing single channel wavelengths and upper case letters B and C designating wavelength bands carrying several channels. The number of channels contained in a waveband may vary. In the illustrated example four channel wavelengths are contained in a single waveband. However, a waveband may carry fewer or more channels, for example two channels or eight channels.

The three nodes 10 illustrated may be arranged consecutively along the transmission path 20. Alternatively intermediate nodes may be connected between these nodes. Any intermediate nodes allow the channel wavelengths a to e to pass through with a known pass-through loss that is substantially the same for all channel wavelengths. In the exemplary embodiment, node X is the source of all the specified channel wavelengths. This node thus includes filters 30 for adding the individual channel wavelengths a, d and e to the transmission path. It also includes two band add filters and multiplexers 40 for adding the wavelength bands B and C. Although not illustrated in FIG. 1, it will be understood that other components are provided in the node for converting electrical signals to optical signals upstream of the filters 30 at a transmitter. Node Y is the destination node for wavelength a and wavelength bands B and C. This node 10 consequently includes a single channel drop 10 filter 50 for wavelength a and two band drop filters and demultiplexers 60 for bands B and C, respectively, coupled to the transmission path 20. As for node X 10, it will be understood that components for converting optical signals to electrical signal are provided at a receiver in node Y 10. The drop filter 50 in this second node Y 10 extracts only the optical channel wavelength a. The filter 50 may be any suitable optical filter, including, but not limited to a thin film filter or a fibre grating filter such as a Bragg grating filter. All other optical wavelengths transmitted on the path 20 are passively passed through filter 50. Each optical demultiplexer 60 likewise extracts only the wavelength band of interest and pass through, or passively relay all other optical wavelengths. Node Z 10 is the destination node for channel wavelengths d and e and thus includes two single channel wavelength filters 50 d and e tuned to the wavelengths of interest.

Each filter 30, 40, 50, 60, has a particular add or extraction loss as well as a pass-through loss. Thus the link loss for any channel wavelength or channel wavelength band depends in part on the number of intermediate channels that are added or dropped. The link loss is defined as the loss experienced along the link between a transmitter in a first node and a receiver in a second node. In accordance with the present invention, this knowledge is utilised to optimise the losses within the network as a whole and thus permit longer transmission distances for individual channels.

In the embodiment shown in FIG. 1 it is assumed for the purpose of illustration that the channels a, d and e and the channel wavelength bands B and C each have the same allowable link loss. In other words, services carried on each channel or channel band can tolerate the same level of absolute power loss over a link. It will be understood, however, that in practice some services carried on a channel wavelength or on a wavelength band may have different power requirements, for example, due to different bit rates, so that the tolerated power loss may be smaller for some channels than for others. A more accurate value for determining the optimum distribution of power loss across different channels is therefore the proportion of actual power loss relative to a maximum allowed link loss. As the name suggests, the maximum allowed link loss is the maximum link power loss that a channel may incur while still providing the necessary service guarantees. This value is known for each service in advance and can thus be used when configuring the network or when a service is added to the network. The proportion of actual link loss to maximum allowed link loss may be expressed as a percentage of the maximum permitted power loss.

In the present embodiment, the distribution of power loss among the channels is optimised by organising the nodes 10, at which two or more channels are added, dropped or both, such that the channel which suffers the highest link losses is subjected to the lowest possible loss within these nodes. Specifically, the channel with the highest loss downstream of the add node X 10 is added to the transmission path last, such that it does not suffer additional pass-through losses from the other add or drop filters. With reference to FIG. 1, it is apparent that the channel wavelengths d and e will be subject to the highest losses outside of the source node X. This is due primarily to the pass-through losses of the drop filters 50 and 60 for the channel wavelengths a, B and C, but also to the additional length of optical fibre, which introduces its own loss. In order to minimise the losses on these channels, the add filters 30 for wavelengths e and d are disposed downstream of the other add filter 30 and multiplexers 40. The filters in receiving nodes 10 are arranged in a similar manner. Hence in node Y, where channel wavelength a and wavelength bands B and C are dropped via a drop filter 50 and two band filters 60, the channel that has the highest total link losses is dropped first in the node. Since channel wavelength a is the first channel added in node X, it is assumed to have the highest losses, as it must be passed through the filters 30 and 40 of the wavelengths d and e and wavelength bands B and C. This channel wavelength is thus dropped first in node Y. Channels carried by waveband B have the next highest losses upstream of node Y; this waveband is therefore the next in line to be dropped.

It will be understood that the losses experienced by any channel wavelength are not due only to the number of filters it is reflected through. Other factors may also be relevant. For example, a channel that is dropped as part of a wavelength band B or C will be filtered further or demultiplexed to extract the single channel wavelength. The number of stages in this further filter will also have an impact on the total link loss, which must be taken into account when determining the total link loss of a channel, and the proportion of maximum allowed link loss. For example, in node Y, channels carried in the wavelength bands B or C are subject to higher link losses than the single channel wavelength a. However, the maximum allowed link loss of these channels is also higher, resulting in the channel bands B and C having the same permitted link loss figure as channels a, d and e. It will be understood that if each channel carried on a channel band B, C were subject to the same restrictions on link loss as the channels a, d and e, the additional loss caused by the multiplexer 40 and demultiplexer 60 would mean that the proportional link loss of the band channels is higher and the wavelength bands B and C would accordingly be dropped from the transmission medium first in node Y 20, and possibly also added to the transmission medium last in node X 20.

In the simplified arrangement shown in FIG. 1, each node 10 either adds channels to, or drops channels from, the network. In practice, however, a single node may be both the starting point and terminating point of different channels and thus comprise both drop and add filters. It will further be appreciated that the add and drop filters shown in the three nodes X, Y and Z may be portions of add/drop filters for the same channel wavelengths. Similarly the band add filters 40 in node X and the band drop filters 60 in node Y may each be part of a multiplexer/demultiplexer component.

Figure 2:
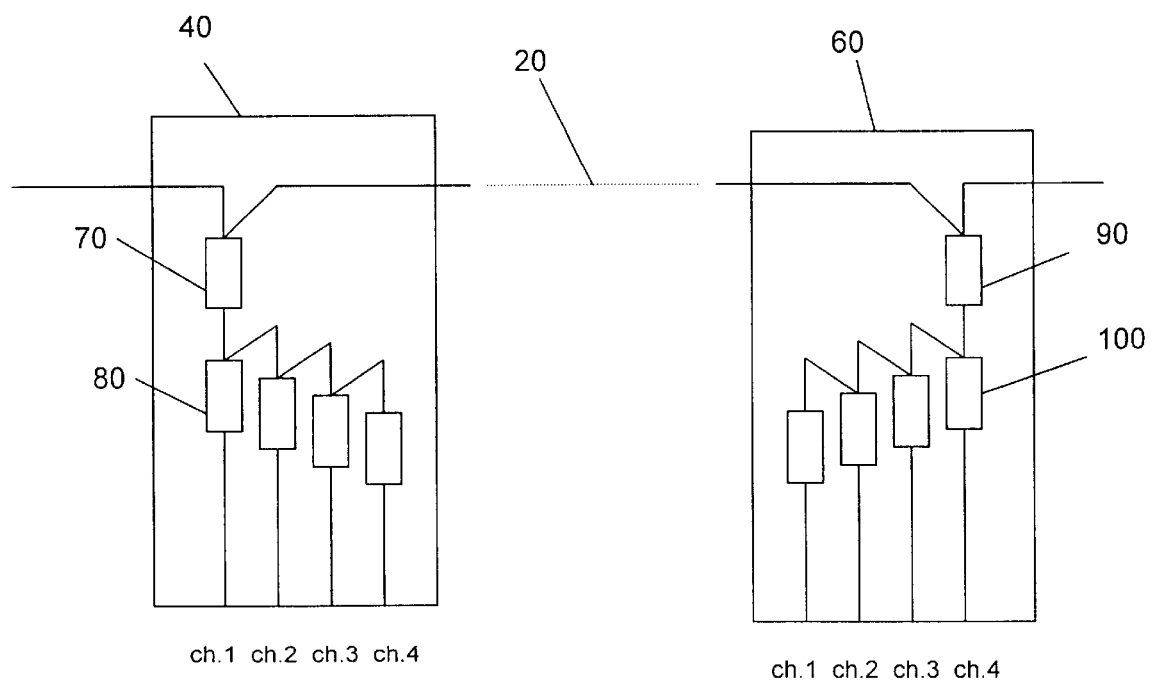
FIG. 2 schematically depicts the arrangement of a multiplexer and demultiplexer for adding and dropping wavelength bands to a transmission path.

Turning now to FIG. 2 the arrangement within a multiplexer 40 and demultiplexer 60 for the same waveband of channels in separate nodes is shown. As mentioned with reference to FIG. 1, the multiplexer 40 and demultiplexer 60 shown in the different nodes may each be part of a combined multiplexer/demultiplexer. The multiplexer 40 and demultiplexer 60 have similar structures. In the described embodiment they each comprise a first single optical interference filter 70, 90 in the form of a thin film filter for adding or dropping, respectively the specified waveband. Four further fine filters 80, 100, are connected in a cascaded arrangement to the first filter 70. Each of these further filters 80, 100 is tuned to the wavelength of one channel ch.1–ch.4: each filter thus drops one channel and passively relays all other wavelengths. Furthermore, at the output of each fine filter 80 the transmitted wavelength is combined with the passively reflected wavelengths on a common fibre. Other filters such as a dichroic filter, Bragg grating filter based on circulators, Bragg grating filter based on fused biconic taper or the like may be utilised both for the band drop filter 70 and the fine filters 80. Depending on the filter technology chosen, passively relayed wavelengths may be transmitted through the filter and not reflected as illustrated in the figure. In both cases, however, the passively relayed wavelength will be subject to a pass-through loss. In the multiplexer 40 it is apparent that signals carried on ch. 4 will be reflected at the three other fine filters 80 before being passed through the first filter 70 and from there onto the transmission medium. This channel will thus be subjected to the three pass-through losses of the other fine filters 80 in addition to the power loss suffered at the first filter 70. In order to compensate for this higher loss sustained at the multiplexer 40, the fine filters 100 in the demultiplexer 60 for the same channel wavelengths are arranged in the reverse order. Hence in the demultiplexer 60, the channel wavelength ch.4 will be filtered out first at its associated fine filter 100 after passing through the first filter 90. The remaining channels ch.3, ch.2 and ch.1 will be passively relayed by the filter 100 tuned to ch.4 and pass on to the remaining fine filters 100. These further fine filters 100 are likewise arranged such that the channel that has sustained the highest link losses due in part to the insertion loss at the transmitter or multiplexer 40 sustains the lowest losses at the receiver or demultiplexer 60.

The arrangement of the various add/drop filters within the nodes and within the multiplexers and demultiplexers is preferably done on installation of the network. The link losses sustained by each channel can be calculated and a suitable arrangement selected to ensure that the proportion of loss relative to a permitted loss sustained by all channels both within a sending and receiving node and along the transmission path or at intermediate nodes are as evenly distributed as possible. Any add/drop filters added to a network at a later date can also be positioned in the most suitable manner to ensure that losses are shared among channels. In this way the likelihood of a small number of channels sustaining significantly higher losses than other channels can be reduced, and thus the overall possible transmission distance for the network increased.

While the invention has been described with reference to a unidirectional optical fibre link, it will be appreciated that a single optical fibre transmission path may be used to send and receive data in both directions. In this case, the arrangement of the add/drop filters must take into account the additional pass-through losses of both add and drop filters for the other channel wavelengths.

What is claimed is:

1. Optical communications network including multiple nodes interconnected by an optical transmission medium adapted to carry multiple wavelength division multiplexed channel wavelengths, wherein filter elements are provided at each node for adding channel wavelengths transmitted by said node to said transmission medium or dropping channel wavelengths destined for said node from said transmission medium and passively relaying all other wavelengths, at least two nodes including at least two filter elements for adding or dropping channel wavelengths, wherein each channel wavelength defines a link from a first node at which said channel wavelength is added to the transmission medium and a second node at which said channel wavelength is dropped from the transmission medium, wherein in said at least two nodes, the filter elements are arranged such that received channel wavelengths with a high link loss relative to an allowed link loss are dropped from said transmission medium upstream of received channel wavelengths with a low link loss relative to an allowed link loss and/or transmitted channel wavelengths with a high link loss relative to an allowed link loss are added to said transmission medium downstream of transmitted channel wavelengths with a low link loss relative to an allowed link loss.

2. A network as claimed in claim 1, wherein said filter elements are interference filters, such as thin film filters.

3. A network as claimed in claim 1, wherein at least one filter element includes first filter means for adding or dropping a specified waveband containing multiple channel wavelengths and multiple cascaded fine filter means connected to said first filter means each for filtering out a specified channel wavelength and passively relaying all other wavelengths.

4. A network as claimed in claim 1, wherein said fine filter means are arranged such that the channel wavelengths within said waveband having higher link losses relative to an allowed link loss are relayed through fewer fine filters than channel wavelengths having lower link losses relative to an allowed link loss.

5. A network as claimed in claim 1, wherein the link loss relative to an allowed link loss is expressed as a proportion of said allowed link loss.

6. A node of an optical communications network connected to an optical transmission medium for carrying multiple wavelength division multiplexed channels, said node having at least two combining elements coupled to said transmission medium, each for adding at least one channel wavelength to said transmission medium, wherein each channel wavelength has an associated path loss, wherein at least one combining element includes first filter means coupled to said transmission medium for adding a specified waveband containing multiple channel wavelengths, and a series of multiple cascaded fine filter means coupled to said first filter means, each for adding a specified channel wavelength and passively relaying all other wavelengths, and wherein said combining elements are arranged such that the channel wavelengths having a higher link loss relative to an allowed link loss are added to the transmission medium downstream of channel wavelengths with a lower link loss relative to an allowed link loss.

7. A node as claimed in claim 6, wherein said fine filter means are arranged such that the channel wavelengths within said waveband having higher link losses relative to an allowed link loss are relayed through fewer fine filters than channel wavelengths having lower link losses relative to an allowed link loss.

8. A node as claimed in claim 6, wherein the link loss is a proportion of an allowed link loss.

9. A node of an optical communications network connected to an optical transmission medium for carrying multiple wavelength division multiplexed channels, said node having at least two wavelength extracting elements coupled to said transmission medium, each for extracting at least one channel wavelength from said transmission medium, wherein each channel wavelength has an associated path loss, wherein at least one extracting element includes first filter means coupled to said transmission medium for dropping a specified waveband containing multiple channel wavelengths, and a series of multiple cascaded fine filter means coupled to said first filter means, each for dropping a specified channel wavelength and passively relaying all other wavelengths, and wherein said extracting elements are arranged such that channel wavelengths with a higher link loss relative to an allowable link loss are extracted from the transmission medium upstream of channel wavelengths with a lower link loss relative to an allowable link loss.

10. A node as claimed in claim 9, wherein said fine filter means are arranged such that the channel wavelengths within said waveband having higher link losses relative to an allowed link loss are relayed through fewer fine filters than channel wavelengths having lower link losses relative to an allowed link loss.

11. A node as claimed in claim 9, wherein the link loss is a proportion of an allowed link loss.

\* \* \* \* \*